F. A WIELAND.
VEHICLE.
APPLICATION FILED JAN. 19, 1914.

1,109,191.

Patented Sept. 1, 1914.

3 SHEETS—SHEET 1.

Witnesses:
T. Colson,
B. G. Richards

Inventor:
Frederick A. Wieland,
By Joshua R. H. Potts
his Attorney.

F. A. WIELAND.
VEHICLE.
APPLICATION FILED JAN. 19, 1914.

1,109,191.

Patented Sept. 1, 1914.
3 SHEETS—SHEET 2.

Witnesses:
T. Coleou,
B. J. Richards

Inventor:
Frederick A. Wieland,
By Joshua R. H. Potts
his Attorney

F. A WIELAND.
VEHICLE.
APPLICATION FILED JAN. 19, 1914.

1,109,191.

Patented Sept. 1, 1914.

3 SHEETS—SHEET 3.

Witnesses:
T. Colson,
B. Y. Richards

Inventor:
Frederick A. Wieland,
By Joshua R. H. Potts
his Attorney.

UNITED STATES PATENT OFFICE.

FREDERICK A. WIELAND, OF CHICAGO, ILLINOIS.

VEHICLE.

1,109,191.  Specification of Letters Patent.  Patented Sept. 1, 1914.

Application filed January 19, 1914. Serial No. 813,146.

*To all whom it may concern:*

Be it known that I, FREDERICK A. WIELAND, a citizen of the United States, and a resident of the city of Chicago, county of Cook, and State of Illinois, have invented certain new and useful Improvements in Vehicles, of which the following is a specification.

My invention relates to improvements in vehicles and has for its object the provision of improved means for preventing overspeeding of the same.

The invention consists in the combinations and arrangements of parts hereinafter described and claimed.

Figure 1:
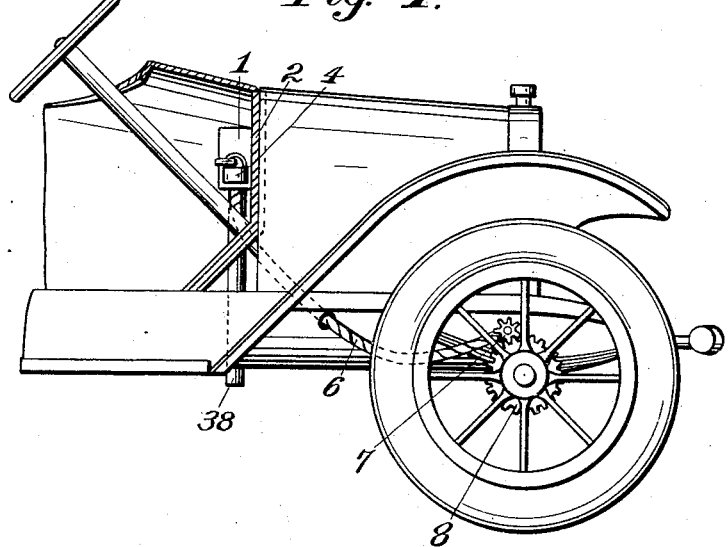
Figure 2:
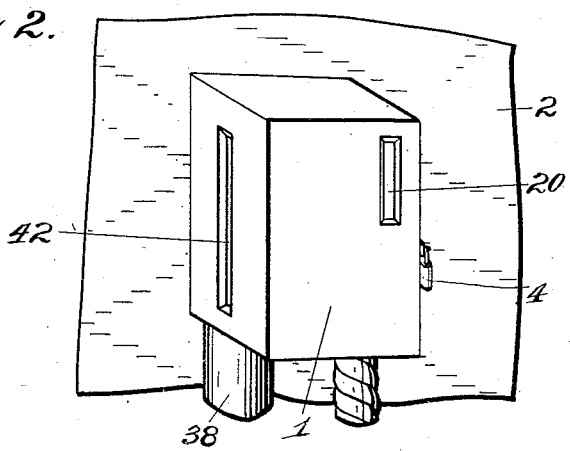
Figure 3:
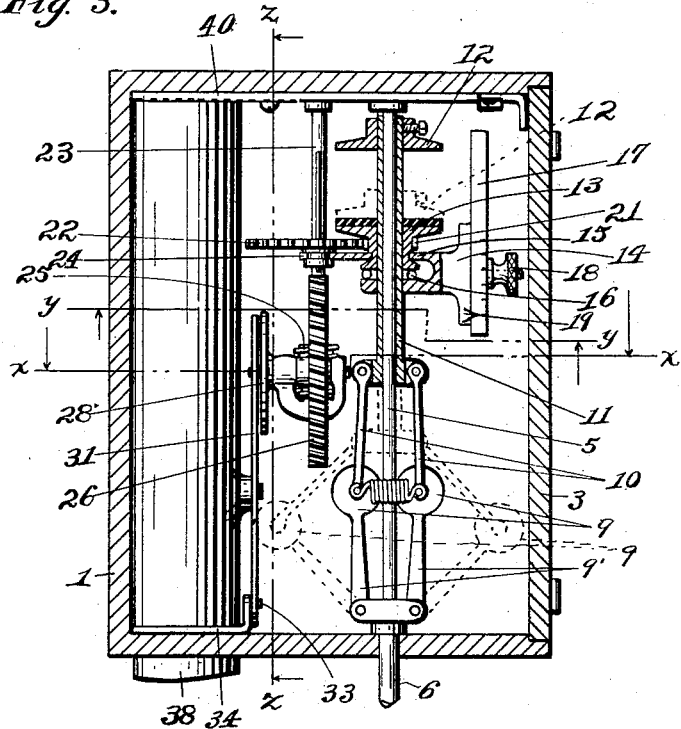
Figure 4:
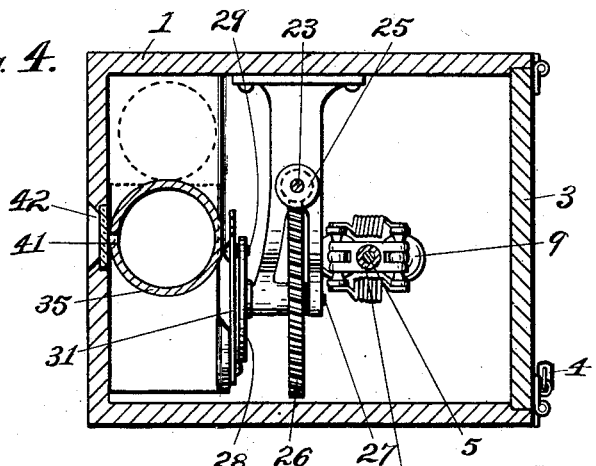
Figure 5:
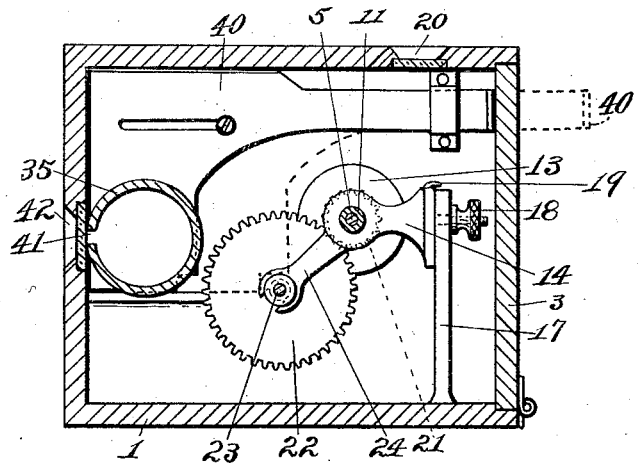
Figure 6:
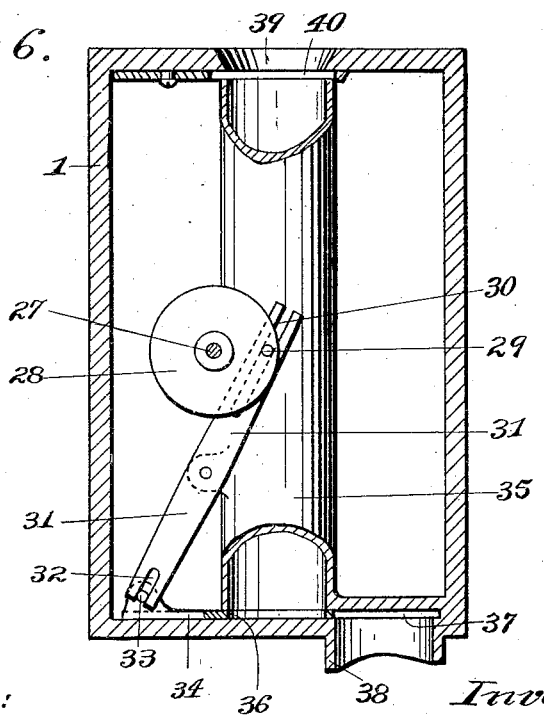

The invention will be best understood by reference to the accompanying drawings forming a part of this specification, and in which, Figure 1 is a side view of the forward portion of an automobile equipped with a device embodying my invention, Fig. 2, a detail perspective view of the device, Fig. 3, an enlarged vertical section taken through the device, Fig. 4, a section taken on line *x—x* of Fig. 3, Fig. 5, a section taken on line *y—y* of Fig. 3, and Fig. 6, a section taken on line *z—z* of Fig. 3.

The preferred form of construction as illustrated in the drawings comprises a casing 1, which is mounted on the dash board 2 of the automobile in any suitable or convenient position. Casing 1 is provided with a hinged door 3, for giving access thereto and said door is provided with a lock 4, as indicated. A governor shaft 5 is suitably mounted in casing 1 and is connected by means of a flexible shaft 6 with a pinion 7 meshing with a gear 8 fixed to one of the front wheels of the automobile, as shown in Fig. 1. By this arrangement, it will be observed, that the governor shaft 5 will be driven at a rate of speed proportionate to the speed of the vehicle.

Governor shaft 5 carries centrifugal governor balls 9 which are mounted on swinging arms 9' fixed to said shaft. Governor balls 9 are connected by pivoted links 10 with a sleeve 11 which is slidable on shaft 5. Sleeve 11 carries a friction disk 12 coöperating with a friction disk 13 which is loosely mounted on sleeve 11, the arrangement being such that at high speeds the friction disk 12 will be drawn into operative contact with friction disk 13, as indicated by dotted lines in Fig. 3. An adjusting head 14 is provided with an arm 15 having a swiveled connection with a groove in the hub of friction disk 13 whereby said friction disk may be adjusted longitudinally on sleeve 11 but remain free for rotation thereon. Head 14 is also provided with a thrust ball bearing 16 adapted to resist the longitudinal thrust exerted on disk 13 by disk 12, as will be readily understood. Head 14 is slidably mounted on a guide 17 and is provided with a clamping nut 18 arranged to secure head 14 and consequently disk 13 in different adjusted positions. Head 14 also carries an indicator finger 19 coöperating with a scale on guide 17 so as to indicate different positions of adjustment of disk 13, the rear wall of casing 1 being provided with a glass covered sight opening 20 which permits of inspection of said scale by the driver of the automobile. Disk 13 carries a gear 21 meshing with a gear 22 which is splined or feathered on a counter-shaft 23 so as to be capable of sliding longitudinally on said counter-shaft and at the same time drive said counter-shaft. Head 14 also carries a forked arm 24 engaging a groove in the hub of gear 22 so as to cause said gear 22 to move on shaft 23 in unison with the movement of disk 13 on sleeve 11 and thus constantly remain in mesh with gear 21, as will be readily understood.

Shaft 23 carries a worm 25 meshing with a worm wheel 26 mounted on a shaft 27 in casing 1, as indicated in Fig. 4. Shaft 27 carries a face plate 28 having a crank pin 29 engaging a slot 30 in the upper end of a lever 31, as shown in Figs. 4 and 6. The lower end of lever 31 is provided with a slot 32 engaging a pin 33 on the side of a discharge slide 34 which is arranged to reciprocate across the open bottom of a container tube 35 arranged in casing 1, as shown. Slide 34 is provided with a discharge opening 36 which is arranged to register with an opening 37 in the bottom of casing 1 and communicating with the upper end of a discharge tube 38 leading from casing 1 through the bottom of the automobile. Container tube 35 is designed to contain a stack of metallic disks or tokens which are stamped with the license number of the automobile, each of said tokens being of exactly the same thickness as slide 34 and of a diameter to fit within discharge opening 36, so that when slide 34 is reciprocated across the bottom of tube 35 and into and out of registration with discharge opening 37, a single token will be discharged through discharge tube 38 at each reciprocation, as will be readily understood. The slide 34 is reciprocated by lever 31 which in turn is operated by crank pin 29 driven from the governor shaft by the gearing explained above. By this arrangement, it will be observed that when the speed of the vehicle is high enough, the disk 12 will be drawn into operative contact with disk 13 and thus cause reciprocation of slide 34 and a discharge of tokens at regular intervals, and that by adjusting disk 13 on sleeve 11 the speed at which this discharge will begin may be varied as desired. Thus, it will be observed that in case the vehicle is speeded up beyond the speed indicated on the scale on slide 17 the discharge of tokens will commence immediately and serve as a means for identifying an over-speeding vehicle. The owner, by keeping a record of the number of tokens supplied in tube 35 and by locking the door 3 of casing 1 can keep check on the manner in which his car is being operated.

The open upper end of container tube 35 is placed in registration with a supply opening 39 in the top of casing 1, said supply opening being normally closed by means of a slide 40 arranged at the top of casing 1, said slide being arranged to abut the door 3 when in closed position. By this arrangement, it will be observed, that slide 40 can only be operated to permit of replenishing the supply of tokens when door 3 is opened thus placing the supply under the control of the owner of the car. At one side, container tube 35 is provided with a slot 41 which is set opposite a glass covered sight opening 42 so as to permit of inspection of the contents of container tube 35 without opening casing 1.

While I have illustrated and described the preferred form of construction for carrying my invention into effect, this is capable of variation and modification without departing from the spirit of the invention. I, therefore, do not wish to be limited to the precise details of construction set forth, but, desire to avail myself of such variations and modifications as come within the scope of the appended claims.

Having described my invention what I claim as new and desire to secure by Letters Patent is:

1. The combination with a vehicle of a token container thereon; means for discharging tokens from said container to the ground; governing means connected to be operated at a speed proportionate to the speed of the vehicle; and means for causing said governing means to effect operation of said discharging means at a predetermined speed, substantially as described.

2. The combination with a vehicle, of a casing mounted thereon; a token container in said casing; a governor shaft in said casing; a centrifugal governor on said shaft; means for driving said shaft at a speed proportionate to the speed of the vehicle; and means operable by said governor for discharging tokens from said container, substantially as described.

3. The combination with a vehicle, of a casing mounted thereon; a token container in said casing; a governor shaft in said casing; a centrifugal governor on said shaft; means for driving said shaft at a speed proportionate to the speed of the vehicle; means for discharging tokens singly from said container; and clutch mechanism operable by said governor arranged to connect said discharging means with said governor shaft, substantially as described.

4. The combination with a vehicle, of a casing mounted on the dash board thereof; a door for said casing; a token container in said casing and open at top and bottom; a slide for closing the top of said container arranged to be controlled by the door of said casing; a discharge slide arranged to reciprocate across the bottom of said container; a discharge tube adapted to receive tokens discharged by said slide and discharge said tokens under said vehicle; a governor shaft in said casing; a centrifugal governor on said shaft; a flexible shaft connected with a front wheel of said vehicle and with said governor shaft; an adjustable friction clutch on said governor shaft connected to be operated by said governor; and an operative connection between said clutch and said discharge slide, substantially as described.

In testimony whereof I have signed my name to this specification in the presence of two subscribing witnesses.

FREDERICK A. WIELAND.

Witnesses:
JOSHUA R. H. POTTS,
HELEN F. LILLIS.

Copies of this patent may be obtained for five cents each, by addressing the "Commissioner of Patents, Washington, D. C."